(12) United States Patent
Inda

(10) Patent No.: US 8,476,174 B2
(45) Date of Patent: Jul. 2, 2013

(54) GLASS AND GLASS-CERAMICS

(75) Inventor: Yasushi Inda, Sagamihara (JP)

(73) Assignee: Ohara, Inc., Kanagawa (JP)

( * ) Notice: Subject to any disclaimer, the term of this patent is extended or adjusted under 35 U.S.C. 154(b) by 0 days.

(21) Appl. No.: 12/609,571

(22) Filed: Oct. 30, 2009

(65) Prior Publication Data

US 2010/0113243 A1  May 6, 2010

(30) Foreign Application Priority Data

Oct. 31, 2008 (JP) .................................. 2008-280978
Sep. 23, 2009 (JP) .................................. 2009-218308

(51) Int. Cl.
*C03C 10/02* (2006.01)

(52) U.S. Cl.
USPC .............. 501/10; 429/320; 429/322; 204/429

(58) Field of Classification Search
USPC ....................... 501/10; 429/320, 322; 204/429
See application file for complete search history.

(56) References Cited

U.S. PATENT DOCUMENTS

| | | | |
|---|---|---|---|
| 5,702,995 A | 12/1997 | Fu | |
| 6,030,909 A | 2/2000 | Fu | |
| 6,315,881 B1 | 11/2001 | Fu | |
| 6,485,622 B1 * | 11/2002 | Fu | 204/421 |
| 7,211,532 B2 * | 5/2007 | Fu | 501/10 |
| 2003/0205467 A1 | 11/2003 | Fu | |
| 2003/0224244 A1 * | 12/2003 | Inda et al. | 429/126 |
| 2006/0246355 A1 | 11/2006 | Min et al. | |

FOREIGN PATENT DOCUMENTS

| | | |
|---|---|---|
| EP | 0857699 | 8/1998 |
| EP | 1049188 | 11/2000 |
| EP | 1088796 | 4/2001 |
| EP | 1926164 | 5/2008 |
| JP | 09142874 | * 6/1997 |
| JP | H09-142874 | 6/1997 |
| JP | H10-097811 | 4/1998 |
| JP | H10-182184 | 7/1998 |
| JP | 2001354421 | * 12/2001 |

OTHER PUBLICATIONS

Fu J, "Fast Li+ ion conduction in Li2O-(Al2O3 Ga2O3)-TiO2-P2O5 glass-ceramics", Journal of Materials Science, vol. 33, No. 6, Mar. 15, 1998, pp. 1549-1553, Springer NL.

* cited by examiner

*Primary Examiner* — Karl Group
(74) *Attorney, Agent, or Firm* — Rankin, Hill & Clark LLP

(57) ABSTRACT

There is provided a lithium ion conductive glass-ceramics which is dense, contains few microvoids causing the decrease in lithium ion conductivity, and achieves good lithium ion conductivity. A glass-ceramics which comprises at least crystallines having an $LiTi_2P_3O_{12}$ structure, the crystallines satisfying $1 < I_{4113}/I_{4104} \leq 2$, wherein $I_{4104}$ is the peak intensity assigned to the plane index 104 (2θ=20 to 21°), and $I_{4113}$ is the peak intensity assigned to the plane index 113 (2θ=24 to 25°) as determined by X-ray diffractometry.

7 Claims, 1 Drawing Sheet

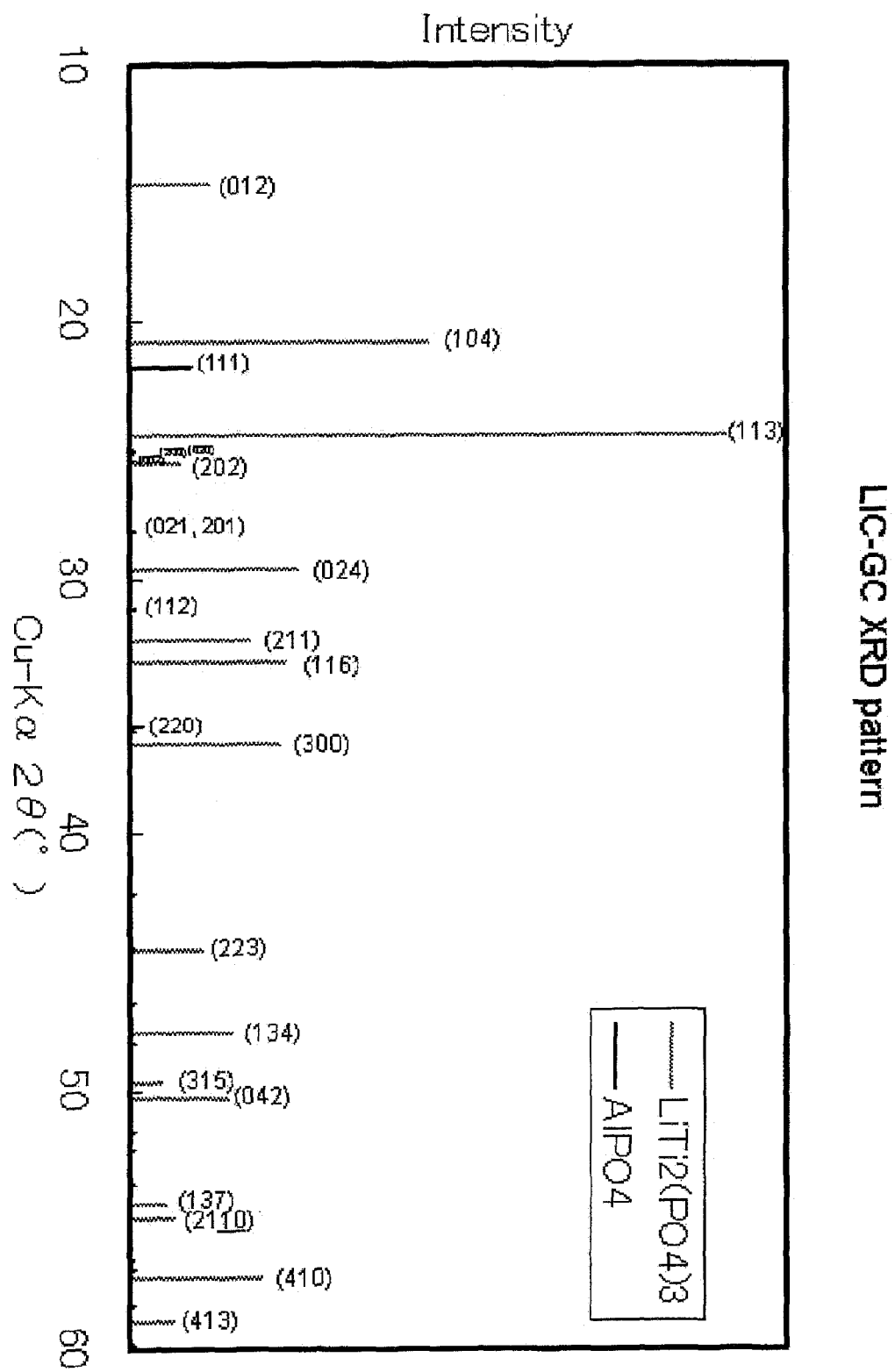

GLASS AND GLASS-CERAMICS

CROSS-REFERENCE TO RELATED APPLICATION

This application is based upon and claims the benefit of priority from the prior Japanese Patent Application No. 2008-280978, filed on Oct. 31, 2008, and Japanese Patent Application No. 2009-218308, filed on Sep. 23, 2009, the entire contents of which are incorporated herein by reference.

BACKGROUND OF THE INVENTION

1. Field of the Invention

The present invention relates to a lithium ion conductive glass-ceramics and a raw glass of a lithium ion conductive glass-ceramics.

2. Description of the Related Art

All solid lithium ion secondary batteries are proposed as safe lithium ion secondary batteries free of combustible organic solvents. In these all solid batteries, lithium ion conductivity is achieved not by nonaqueous electrolyte solutions but by solid electrolytes. Solid electrolytes have lower ion conductivity than nonaqueous electrolyte solutions. Therefore, improvement of lithium ion conductivity of solid electrolytes has been required.

Improvement of lithium ion conductivity is also required for the use of lithium ion conductive solid electrolytes in lithium-air batteries.

As solid electrolytes having high lithium ion conductivity, Japanese Patent Application Laid-Open Nos. 9-142874, 10-97811, and 10-182184 propose lithium ion conductive glass-ceramics. Lithium ion conductive glass-ceramics is produced by molding molten glass, and then heat treating the molded glass to precipitate (crystallize) lithium ion conductive crystallines. Since lithium ion conductive glass-ceramics is produced through these processes, it contains less voids causing the decrease in lithium ion conductivity than ceramic produced by sintering a ceramic powder. Therefore, the glass solid electrolytes have higher lithium ion conductivity than ceramic solid electrolytes.

SUMMARY OF THE INVENTION

However, commercialization of all solid lithium ion batteries requires further improvement of lithium ion conductivity from a practical standpoint. The inventors found that glass-ceramics is less prone to develop voids than ceramic for manufacturing, but can develop microvoids during crystallization, and that such microvoids decrease lithium ion conductivity.

As a result of dedicated research in view of the above-described problems, the inventors have found that glass-ceramics having a specific crystalline structure is less prone to develop microvoids causing the decrease in lithium ion conductivity, and have accomplished the present invention. Specific aspects of the present invention are described below.

(Item 1)

A glass which precipitates at least crystallines having an $LiTi_2P_3O_{12}$ structure upon heat treatment, the crystallines satisfying $1 < I_{A113}/I_{A104} \leq 2$, wherein $I_{A104}$ is the peak intensity assigned to the plane index 104 ($2\theta$=20 to 21°), and $I_{A113}$ is the peak intensity assigned to the plane index 113 ($2\theta$=24 to 25°) as determined by X-ray diffractometry.

(Item 2)

The glass according to item 1, which precipitates crystallines having an $AlPO_4$ structure upon heat treatment.

(Item 3)

The glass according to item 1 or 2, which satisfies $4 < I_{A113}/I_{B111} < 11$, wherein $I_{B111}$ is the peak intensity assigned to the plane index 111 ($2\theta$=21 to 22°) of the crystallines having an $AlPO_4$ structure as determined by X-ray diffractometry.

(Item 4)

The glass according to any one of items 1 to 3, comprising the following components in terms of mol % oxides:
  $Li_2O$, 11 to 17%;
  $Al_2O_3$, 4 to 10%;
  $SiO_2$, 1 to 8%;
  $P_2O_5$, 31 to 39%;
  $TiO_2$, 35 to 42%; and
  $ZrO_2$, 0 to 5%.

(Item 5)

A glass powder produced by milling the glass according to any one of items 1 to 4.

(Item 6)

A glass-ceramics comprising at least crystallines having an $LiTi_2P_3O_{12}$ structure, the crystallines satisfying $1 < I_{A113}/I_{A104} \leq 2$, wherein $I_{A104}$ is the peak intensity assigned to the plane index 104 ($2\theta$=20 to 21°), and $I_{A113}$ is the peak intensity assigned to the plane index 113 ($2\theta$=24 to 25°) as determined by X-ray diffractometry.

(Item 7)

The glass-ceramics according to item 6, comprising crystallines having an $AlPO_4$ structure.

(Item 8)

The glass-ceramics according to item 7, which satisfies $4 < I_{A113}/I_{B111} < 11$, wherein $I_{B111}$ is the peak intensity assigned to the plane index 111 ($2\theta$=21 to 22°) of the crystallines having an $AlPO_4$ structure as determined by X-ray diffractometry.

(Item 9)

The glass-ceramics according to any one of items 6 to 8, comprising the following components in terms of mol % oxides:
  $Li_2O$, 11 to 17%;
  $Al_2O_3$, 4 to 10%;
  $SiO_2$, 1 to 8%;
  $P_2O_5$, 31 to 39%;
  $TiO_2$, 35 to 42%; and
  $ZrO_2$, 0 to 5%.

(Item 10)

The glass-ceramics according to any one of items 6 to 9, having a lithium ion conductivity of $5 \times 10^{-5}$ Scm$^{-1}$ or more at 25° C.

(Item 11)

The glass-ceramics according to any one of items 6 to 10, having a specific gravity of 2.6 to 3.0.

(Item 12)

A glass-ceramics powder produced by milling the glass-ceramics according to any one of items 6 to 11.

(Item 13)

A lithium ion conductive solid electrolyte produced by sintering a compact containing at least the glass powder according to item 5 and/or the glass-ceramics powder according to item 12.

(Item 14)

A method for producing the glass according to any one of items 1 to 4, comprising melting glass raw materials into a molten glass, and quenching the molten glass at a rate of 100° C./second or higher.

(Item 15)

A method for producing the glass-ceramics according to any one of items 6 to 11, comprising heat treating the raw glass thereby precipitating crystallines, wherein the maximum temperature of the heat treatment is from 850° C. to 1050° C., and the duration of the maximum temperature is 24 hours or less.

(Item 16)

The method for producing a glass-ceramics according to item 15, wherein in the heat treatment of the raw glass, the temperature rising rate at the crystallization starting temperature of the raw glass is initiated is from 25° C./h to 1200° C./h.

According to the present invention, there can be provided a lithium ion conductive solid electrolyte having a high density and a high lithium ion conductivity, and being less prone to develop microvoids causing the decrease in lithium ion conductivity.

BRIEF DESCRIPTION OF THE DRAWING

Figure shows the X-ray diffraction patterns of the $LiTi_2P_3O_{12}$ and $AlPO_4$ crystalline phases of the glass-ceramics of the present invention, accompanied by plane indices.

DETAILED DESCRIPTION OF THE INVENTION

The present invention is further described below.

The glass-ceramics of the present invention is produced by heat treating a raw glass to precipitate crystallines, and contains at least crystallines having an $LiTi_2P_3O_{12}$ structure. The crystallines satisfy $1<I_{A113}/I_{A104}\leq2$, wherein $I_{A104}$ is the peak intensity assigned to the plane index 104 ($2\theta=20$ to $21°$), and $I_{A113}$ is the peak intensity assigned to the plane index 113 ($2\theta=24$ to $25°$) as determined by X-ray diffractometry.

The peak intensity assigned to a specific plane index determined by X-ray diffractometry means the peak height in X-ray diffractometry.

The glass-ceramics containing the above-described crystallines has not been coarsened by overgrown crystallines, so that has less microvoids than prior art lithium ion conductive glass-ceramics, thereby achieving high lithium ion conductivity.

If the $I_{A113}/I_{A104}$ ratio is 1 or less, the glass will not achieve high ion conductivity because of insufficient precipitation and growth of crystallines. Therefore, the $I_{A113}/I_{A104}$ ratio is preferably more than 1, more preferably 1.2 or more, and most preferably 1.4 or more.

If the $I_{A113}/I_{A104}$ ratio is more than 2, the crystallines overgrow to cause a deficiency of glass or secondary phase components between crystal grains to develop voids in the glass-ceramics. Therefore, the $I_{A113}/I_{A104}$ ratio is preferably 2 or less, more preferably 1.95 or less, and most preferably 1.9 or less.

The crystalline having an $LiTi_2P_3O_{12}$ structure has the same crystalline structure with commonly known NASICON (Na Super Ionic Conductor: $Na_3Zr_2Si_2PO_{12}$), and contains paths through which Li ions are three-dimensionally diffused in the crystalline. The crystalline allows three-dimensional diffusion of Li ions, and thus achieves Li ion conductivity in polycrystalline substance irrespective of crystal orientation. Therefore, the main crystalline phase of the glass preferably has this crystalline structure.

The ion conductivity in the crystalline depends on the number of Li ion sites, the concentration of ion carriers, and the vacancy size of the conduction path. The ion conductivity can be increased by partially substituting high valence elements with low valence elements. It is preferred that tetravalent Ti sites are partially substituted with trivalent Al, whereby the number of Li ion sites is increased to achieve a high ion conductivity.

It is also preferred that pentavalent P sites are partially substituted with tetravalent Si, whereby the number of Li ion sites is increased to achieve high ion conductivity.

The crystallines having the $LiTi_2P_3O_{12}$ structure according to the present invention preferably contain no Ge at Ti sites. If Ti sites are substituted with Ge, the crystallines do not have the effect of increasing Li ion carriers, but decrease ion conductivity and chemical durability.

The glass-ceramics of the present invention further includes crystallines having an $AlPO_4$ structure which structurally bond $LiTi_2P_3O_{12}$ crystal grains composing the main crystalline phase. $AlPO_4$ has low ion conductivity, but will not inhibit ion conduction between $LiTi_2P_3O_{12}$ when it thinly exists therebetween, which is preferable. The crystallines having an $AlPO_4$ structure preferably satisfies $4<I_{A113}/I_{B111}<11$, wherein $I_{B111}$ is the peak intensity assigned to the plane index 111 ($2\theta=21$ to $22°$) as determined by X-ray diffractometry, thereby achieving high ion conductivity and a void-free microstructure.

If the $I_{A113}/I_{B111}$ ratio is 4 or less, $AlPO_4$ crystallines are too much and overgrown to decrease the ion conductivity. Therefore, the $I_{A113}/I_{B111}$ ratio is preferably more than 4, more preferably 4.3 or more, and most preferably 4.5 or more.

If the $I_{A113}/I_{B111}$ ratio is more than 11, $AlPO_4$ crystallines are too few and bonding between $LiTi_2P_3O_{12}$ main crystalline phases to develop ion conductivity is insufficient, which result in low ion conductivity. Therefore, the $I_{A113}/I_{B111}$ ratio is preferably 11 or less, more preferably 10.5 or less, and most preferably 10 or less.

Figure shows the X-ray diffraction patterns of the above-described $LiTi_2P_3O_{12}$ and $AlPO_4$ crystalline phases, accompanied by plane indices.

The glass-ceramics of the present invention can be produced by heat treating raw glass containing the following components in term of mol % of the oxides:

$Li_2O$, 11 to 17%;
$Al_2O_3$, 4 to 10%;
$SiO_2$, 1 to 8%;
$P_2O_5$, 31 to 39%;
$TiO_2$, 35 to 42%; and
$ZrO_2$, 0 to 5%.

The above components scarcely evaporate during heat treatment of the raw glass for precipitating crystallines. Therefore, the glass-ceramics of the present invention has the same composition with the raw glass having the above-described composition.

Description of the components of the glass-ceramics in term of mol % of the oxides is based on the assumption that oxides and nitrates used as the raw materials of the components of the glass-ceramics of the present invention are completely decomposed and converted into oxides during melting. Given that the total amount of the oxide products is 100 mol %, the proportions of the components of the glass-ceramics are described. The above-described components are further described below.

The $Li_2O$ component is necessary to supply $Li^+$ ion carriers thereby developing lithium ion conductivity, and thus is preferably abundant in the glass-ceramics. However, with the intention of achieving high ion conductivity, if the $Li_2O$ component occupies all the Li sites of the $LiTi_2P_3O_{12}$ crystalline phase precipitated by glass crystallization, Li ions can hinder the movement of ions. In order to achieve good ion conductivity, the lower limit of the content of the $Li_2O$ component is preferably 11 mol %, more preferably 11.5 mol %, and even more preferably 12 mol %. If the $Li_2O$ component is too much, the ion mobility decreases during crystallization, and the thermal stability of the glass tends to decrease. Therefore, the upper limit of the content is preferably 17 mol %, more preferably 16 mol %, and even more preferably 15 mol %.

The $Al_2O_3$ component can improve thermal stability of the raw glass. $Al^{3+}$ ions substitute Ti at the Ti sites in the crystalline phase, whereby tetravalent Ti is substituted with trivalent Al. As a result of this, the number of Li sites is increased by the number of substitution with Al thereby keeping electrical neutrality, and the increase of the number of Li sites contributes to the improvement of lithium ion conductivity. Since Al ions are smaller than Ti ions, they will not hinder smooth movement of Li ions. This contributes to the increase of Li ion sites and the improvement of ion conductivity. The $Al_2O_3$ component is also involved in the control of the amount of $AlPO_4$ forming the secondary crystalline phase. If the amount of the $Al_2O_3$ component is too much, the amount of $AlPO_4$ crystallines is so large that the glass-ceramics has low conductivity. On the other hand, if the amount of the $Al_2O_3$ component is too few, the amount of the Al component is insufficient for the formation of $AlO_4$ crystallines, which results in a failure of the favorable bonding between $LiTi_2P_2O_{12}$ main crystalline phase. As a result of this, the ion conductivity decreases, and voids occur in the glass-ceramics. In order to achieve the effects of the $Al_2O_3$ component, the lower limit of the content is preferably 4 mol %, more preferably 5 mol %, and even more preferably 6 mol %. However, if the content is more than 10 mol %, the glass tends to have poor thermal stability, and the glass ceramic tends to have poor conductivity. Therefore, the upper limit of the content is preferably 15 mol %, more preferably 9 mol %, and even more preferably 8 mol %.

The $SiO_2$ component can improve the melting properties and thermal stability of the raw glass. In addition, $Si^{4+}$ ions substitute the P at the P site in the crystalline phase, whereby pentavalent P is substituted with tetravalent Si. As a result of this, the number of Li sites increases by the number of substitution with Si thereby keeping electrical neutrality, and the increase of the number of Li sites contributes to the improvement of lithium ion conductivity. In order to sufficiently achieve this, the lower limit of the content is preferably 1 mol %, more preferably 1.5 mol %, and even more preferably 2 mol %. However, if the content is more than 8 mol %, the ion conductivity tends to decrease. Therefore, the upper limit of the content is preferably 8 mol %, more preferably 6 mol %, and even more preferably 5 mol %.

The $P_2O_5$ component is necessary for the glass formation, and is a component of the above-described $LiTi_2P_3O_{12}$ main crystalline phase and $AlPO_4$ secondary crystalline phase. If the content of the $P_2O_5$ component is less than 31 mol %, glass formation hardly occurs. Therefore, the lower limit of the content is preferably 31 mol %, more preferably 33 mol %, and even more preferably 34 mol %. If the content is more than 39 mol %, the above-described crystalline phases poorly precipitate in the glass, which results in the failure to achieve desired properties. Therefore, the upper limit of the content is preferably 39 mol %, more preferably 38 mol %, and even more preferably 37 mol %.

The $TiO_2$ component contributes to the glass formation, and is a component of the above-described main crystalline phase. Therefore, the $TiO_2$ component is important both for the glass and crystalline phase. In order to achieve glass formation and precipitation of the main crystalline phase in the glass thereby achieving high ion conductivity, the lower limit of the content of the $TiO_2$ component is preferably 35 mol %, more preferably 36 mol %, and even more preferably 37 mol %. If the content of the $TiO_2$ component is too high, the glass tends to have poor thermal stability, and the glass ceramic tends to have poor ion conductivity. Therefore, the upper limit of the content is preferably 42 mol %, more preferably 41 mol %, and even more preferably 40 mol %.

The $ZrO_2$ component contained in the glass promotes nucleation during crystallization. Therefore, the $ZrO_2$ component allows crystallization at lower temperatures, and thus facilitates the formation and growing of crystallines of the main crystalline phase. Through crystallization, Zr ions substitute Ti ions at Ti sites. Since Zr ions are larger than Ti ions, too much Zr ions hinder the movement of Li ions and glass formation. Therefore, the content of the $ZrO_2$ component is preferably low. In order to achieve glass formation and precipitation of the main crystalline phase from the glass thereby achieving high ion conductivity, the lower limit of the content of the $ZrO_2$ component is preferably 0 mol %, more preferably 0.1 mol %, and even more preferably 0.2 mol %. The upper limit of the content is preferably 5 mol %, more preferably 3 mol %, and even more preferably 2 mol %.

The effect of the $Ga_2O_3$ component is comparable to that of the $Al_2O_3$ component, but Ga is scarce and expensive. Therefore, the $Ga_2O_3$ component is preferably not contained in the glass from a commercial standpoint.

The $GeO_2$ component substitutes the $TiO_2$ component, and facilitates glass formation. However, the component decreases the ion conductivity by adding the $GeO_2$ component, and Ge is scarce and expensive. Therefore, the $GeO_2$ component is preferably not contained in the glass from a commercial standpoint.

The glass ceramic or raw glass preferably contains no alkali metal other than $Li_2O$, such as $Na_2O$ or $K_2O$. If these components are present in the glass ceramic, mixed alkali ions tend to inhibit the conduction of $Li^+$ ions to decrease the ion conductivity. If the glass ceramic contains sulfur, lithium ion conductivity slightly improves, but chemical durability and stability decrease. Therefore, the glass ceramic preferably contains no sulfur. In addition, the glass ceramic preferably contains no components potentially harmful to the environment and human body, such as Pb, As, Cd, and Hg.

In order to produce the glass-ceramics of the present invention, the raw glass is heat treated at a temperature of 850° C. to 1050° C. for a period of 24 hours or less thereby growing crystallines. More specifically, the raw glass is heat treated at a constant temperature selected from 850° C. to 1050° C. for a specific time. The heat treatment is referred to as crystallization, and the treatment temperature is referred to as crystallization temperature. The crystallization temperature is the maximum temperature during crystallization. The temperature is increased and decreased before and after the crystallization. The glass-ceramics thus obtained is subjected to X-ray diffractometry. If the $I_{A113}/I_{A104}$ ratio is 1 to 2, the heat treatment conditions are rated as good. When the crystallization temperature is high, the duration of the crystallization temperature is preferably short, and when the crystallization temperature is low, the duration of the crystallization temperature is preferably short.

If the crystallization temperature is higher than 1050° C., the main crystalline phase decomposes to cause the decrease in ion conductivity. Even if the crystallization temperature is not higher than 1050° C., the crystallines may overgrow if the temperature is kept for a long time. When the crystallization temperature is 1000° C. or higher, the crystallines grow so quickly that the glass ceramic may break or the crystalline phase may decompose during crystallization over a long period. Therefore, when crystallization is carried out at 1000° C. or higher, the duration is preferably two hours or less, and more preferably one hour or less. When the crystallization is carried out at 1000° C. or higher, the lower limit of the duration is 0 minute. "0 minutes" means that the decrease of the temperature is initiated once the heat treatment furnace has reached the set heat treatment temperature.

If the crystallization temperature is lower than 850° C., the formation and growth of the crystallines are insufficient, so that the resultant glass ceramic has poor ion conductivity. Therefore, the crystallization temperature is preferably 850° C. or higher. If the crystallization temperature is 850° C. or higher and lower than 900° C., the formation and growth of the crystallines are insufficiently achieved by heat treatment for a short period of time, so that the resultant glass ceramic has poor ion conductivity. In this case, the heat treatment time is preferably 5 hours or more and 24 hours or less. When the crystallization temperature is 900° C. or higher and lower than 950° C., the heat treatment time is preferably 2 hours or more and 24 hours or less. When the crystallization temperature is 950° C. or higher and 1000° C. or lower, heat treatment time is preferably 0.1 hour or more and 12 hours or less.

During the increase of the temperature, if the temperature rising rate near the crystallization starting temperature is too low, too many crystalline nuclei are formed to inhibit the growth of crystallines. On the other hand, if the crystallization temperature is kept for a long time, fine cracks can appear. Therefore, the temperature rising rate at the crystallization starting temperature is preferably 25° C./h or more, and more preferably 50° C./h or more.

If the temperature rising rate is too high, the temperature difference can develop between the glass surface exposed to heat and the inside of the glass, and cracks can be caused by the difference of the coefficient of thermal expansion of the glass and glass ceramic. Therefore, the temperature rising rate at the crystallization starting temperature is preferably 1200° C./h or less, and more preferably 1000° C./h or less.

In the present invention, the "crystallization starting temperature" is determined by heating the glass at a constant rate using a heat analyzer for differential thermal analysis, and calculating the starting temperature of the exothermic peak incident to crystallization. The heat analyzer may be, for example, STA-409 manufactured by NETSZCH. It is preferred that the crystallization temperature is higher than the crystallization starting temperature, thereby achieving sufficient crystalline growth. Therefore, the crystallization starting temperature is passed during the temperature rising process before crystallization.

When the glass-ceramics of the present invention is used as a solid electrolyte, the molten glass having the above-described composition is casted into a glass compact, and the glass compact thus obtained is heat treated to make glass-ceramics. As necessary, the glass-ceramics is further subjected to treatment such as grinding and polishing.

In order to produce solid electrolytes in various forms with minimum wastage of the materials, the glass-ceramics of the present invention or the raw glass may be milled into a powder using a ball mill or a jet mill, followed by molding and sintering.

When the glass-ceramics of the present invention is milled, the particles contain no void and have a high density because crystallines are precipitated in the glass phase. When the compact composed of the glass-ceramics powder is sintered, the glass phase of the glass-ceramics serves as a liquid phase to bond the particles, and thus producing a solid electrolyte having a high density.

When the raw glass of the glass-ceramics of the present invention is milled, the glass serves as a liquid phase during sintering to bond the particles thereby forming a dense compact, and then crystallines precipitate. Since microvoids hardly occur during the precipitation of the crystallines, the resultant solid electrolyte has high ion conductivity with a high density.

Through the use of the above-described method of making a compact from a powder, a solid electrolyte in a sheet form can be readily obtained with minimum wastage of the materials.

For example, the glass-ceramics or the raw glass is milled into a powder, and the powder is mixed with an organic binder and a solvent to make a slurry, and the slurry is formed into a sheet by a coating method such as doctor blade coating, calender coating, spin coating, or dip coating, a printing method such as inkjet printing, bubble jet (registered trademark) printing, and offset printing, a die coating method, or a spraying method, thereby making a green sheet, followed by sintering.

The above-described powder may be contained in electrodes of a all solid lithium ion battery, thereby forming ion conductive paths in the electrodes.

EXAMPLES

Example 1

The glass of the present invention is further described below with reference to specific examples.

The raw materials were $H_3PO_4$, $Al(PO_3)_3$, and $Li_2CO_3$ manufactured by Nippon Chemical Industries Co., Ltd., $SiO_2$ manufactured by Nitchitsu Co., Ltd., and $TiO_2$ manufactured by Sakai Chemical Industry Co., Ltd. These materials were weighed so as to contain 15% $Li_2O$ component, 8% $Al_2O_3$ component, 4% $SiO_2$ component, 35% $P_2O_5$ component, and 38% $TiO_2$ component in terms of mol % of oxides, and uniformly mixed. Thereafter, the mixture was placed in a platinum pot, and heated for 3 hours in an electric furnace at 1500° C. under stirring, thereby obtaining a glass melt. A platinum pipe connected to the platinum pot was heated, through which the glass melt was poured between a pair of moving stainless steel rolls under water cooling, and quenched, thereby making a thin glass piece.

The glass piece thus obtained was annealed in an electric furnace at 600° C. for 2 hours. The furnace temperature was increased to 950° C. at a temperature rising rate of 100° C./h, keeped for 10 hours, and then the glass piece was slowly cooled in the electric furnace, thereby making a glass-ceramics.

The glass-ceramics thus obtained was milled into a powder, and the crystallines precipitated in the glass-ceramics were analyzed using an X-ray diffraction measuring apparatus manufactured by Philips, thereby identifying the crystalline phases; the main crystalline phase was $LiTi_2P_3O_{12}$, and the secondary crystalline phase was $AlPO_4$.

The ratio of the peak intensity $I_{A104}$ assigned to the plane index 104 (2θ=20 to 21°) of the main crystalline phase to the peak intensity $I_{A113}$ assigned to the plane index 113 (2θ=24 to 25°) was $I_{A113}/I_{A104}$=1.9. The ratio of the peak intensity $I_{B111}$ assigned to the plane index 111 (2θ=21 to 22°) of the crystalline having an $AlPO_4$ structure to the peak intensity $I_{A113}$ assigned to the plane index 113 (2θ=24 to 25°) of $LiTi_2P_3O_{12}$ was $I_{A113}/I_{B111}$=10.

The specific gravity of the glass-ceramics was 2.8 as measured by the Archimedes method.

The microstructure of the obtained glass-ceramics was observed using SEM-3000N manufactured by Hitachi, Ltd.; the glass-ceramics was density, and did not contain voids having a size of 1 μm or more.

Gold was sputtered on the front and back sides of the glass-ceramics using Quick Coater manufactured by Sanyu Electron Co., Ltd., thus forming gold electrodes. The lithium ion conductivity at 25° C. was determined from complex impedance measurement by an AC two terminal method using an impedance analyzer SI-1260 manufactured by Solartron; the lithium ion conductivity at 25° C. was $1.2 \times 10^{-3}$ S·cm$^{-1}$.

Comparative Example 1

The raw materials were $H_3PO_4$, $Al(PO_3)_3$ and $Li_2CO_3$ manufactured by Nippon Chemical Industries Co., Ltd., $SiO_2$ manufactured by Nitchitsu Co., Ltd., and $TiO_2$ manufactured by Sakai Chemical Industry Co., Ltd. These materials were weighed so as to contain 11.5% of $Li_2O$ component, 6.5% of $Al_2O_3$ component, 9% of $SiO_2$ component, 31% of $P_2O_5$ component, and 42% of $TiO_2$ component in terms of mol % of oxides, and uniformly mixed.

Thereafter, the mixture was placed in a platinum pot, and heated for 3 hours in an electric furnace at 1500° C. under stirring in the similar manner to in Example 1, thereby obtaining a glass melt. A platinum pipe connected to the platinum pot was heated, through which the glass melt was poured between a pair of moving stainless steel rolls under water cooling, and quenched, thereby making a thin glass piece.

The glass piece thus obtained was annealed in an electric furnace at 600° C. for 2 hours. The furnace temperature was increased to 950° C., keeped for 10 hours, and then the glass piece was slowly cooled in the electric furnace, thereby making a glass-ceramics.

The glass-ceramics piece thus obtained was milled into a powder, and the crystallines precipitated in the glass-ceramics were analyzed using an X-ray diffraction measuring apparatus manufactured by Philips, thereby identifying the crystalline phases; the main crystalline phase was $LiTi_2P_3O_{12}$, and the secondary crystalline phase was $AlPO_4$.

The ratio of the peak intensity $I_{A104}$ assigned to the plane index 104 (2θ=20 to 21°) of the main crystalline phase to the peak intensity $I_{A113}$ assigned to the plane index 113 (2θ=24 to 25°) was $I_{A113}/I_{A104}$=2.1. The ratio of the peak intensity $I_{B111}$ assigned to the plane index 111 (2θ=21 to 22°) of the crystalline having an $AlPO_4$ structure to the peak intensity $I_{A113}$ assigned to the plane index 113 (2θ=24 to 25°) of $LiTi_2P_3O_{12}$ was $I_{A113}/I_{B111}$=14.

The specific gravity of the glass-ceramics was 2.8 as measured by the Archimedes method.

The microstructure of the glass-ceramics was observed using SEM-3000N manufactured by Hitachi, Ltd.; an infinite number of amorphous voids having a size of about 1 μm were found.

Gold was sputtered on the front and back sides of the glass-ceramics using Quick Coater manufactured by Sanyu Electron Co., Ltd., thus forming gold electrodes. The lithium ion conductivity at 25° C. was determined from complex impedance measurement by an AC two terminal method using an impedance analyzer SI-1260 manufactured by Solartron; the lithium ion conductivity at 25° C. was $1.0 \times 10^{-3}$ S·cm$^{-1}$.

The ion conductivity was rather lower than that in Example 1, and voids were dispersed in the glass-ceramics, indicating that the glass-ceramics was not a void-free dense product.

Example 2

The glass obtained in Example 1 was milled using a ball mill, thus obtaining a glass powder having a maximum particle size of 1 μm or less. The glass powder was mixed with water containing an organic acryl binder and a surfactant, thus making a slurry. The slurry was applied using a doctor blade to a base film which has been subjected to surface release treatment, and dried to form a green sheet. The dried green sheet was removed from the film, placed on a quartz substrate in an electric furnace, and subjected to degreasing and sintering. In order to achieve crystallization, the green sheet was heated to 1000° C. at a temperature rising rate of 600° C./h, kept at 1000° C. for 20 minutes, and naturally cooled to room temperature in an electric furnace.

The glass-ceramics thus obtained was analyzed using an X-ray diffraction measuring apparatus manufactured by Philips, thereby identifying the crystalline phases; the main crystalline phase was $LiTi_2P_3O_{12}$, and the secondary crystalline phase was $AlPO_4$.

The ratio of the peak intensity $I_{A104}$ assigned to the plane index 104 (2θ=20 to 21°) of the main crystalline phase to the peak intensity $I_{A113}$ assigned to the plane index 113 (2θ=24 to 25°) was $I_{A113}/I_{A104}$=1.9. The ratio of the peak intensity $I_{B111}$ assigned to the plane index 111 (2θ=21 to 22°) of the crystalline having an $AlPO_4$ structure to the peak intensity $I_{A113}$ assigned to the plane index 113 (2θ=24 to 25°) of $LiTi_2P_3O_{12}$ was $I_{A113}/I_{B111}$=5.

The specific gravity of the glass-ceramics was 2.8 as measured by the Archimedes method.

The microstructure of the obtained glass-ceramics was observed using SEMS-3000N manufactured by Hitachi, Ltd.; the glass-ceramics was dense sintered body, and did not contain voids having a size of 1 μm or more.

The front and back sides of the sintered substrate having the sintered green sheet were milled and polished, and then gold was sputtered as a target on the front and back sides of the glass-ceramics using Quick Coater manufactured by Sanyu Electron Co., Ltd., thus forming gold electrodes. The lithium ion conductivity at 25° C. was determined from complex impedance measurement by an AC two terminal method using an impedance analyzer SI-1260 manufactured by Solartron; the lithium ion conductivity at 25° C. was $3.5 \times 10^{-4}$ S·cm$^{-1}$.

Comparative Example 2

The glass obtained in Comparative Example 1 was milled using a ball mill, thus obtaining a glass powder having a maximum particle size of 1 μm or less. The glass powder was mixed with water containing an organic acryl binder and a surfactant, thus making a slurry. The slurry was applied using a doctor blade to a base film which has been subjected to surface release treatment, and dried to form a green sheet. The dried green sheet was removed from the film, placed on a quartz substrate in an electric furnace, and subjected to degreasing and sintering. The sintering temperature was 1000° C.

The glass-ceramics thus obtained was analyzed using an X-ray diffraction measuring apparatus manufactured by Philips, thereby identifying the crystalline phases; the main crystalline phase was $LiTi_2P_3O_{12}$, and the secondary crystalline phase was $AlPO_4$.

The ratio of the peak intensity $I_{A104}$ assigned to the plane index 104 (2θ=20 to 21°) of the main crystalline phase to the peak intensity $I_{A113}$ assigned to the plane index 113 (2θ=24 to 25°) was $I_{A113}/I_{A104}$=2.0. The ratio of the peak intensity $I_{B111}$ assigned to the plane index 111 (2θ=21 to 22°) of the crystalline having an $AlPO_4$ structure to the peak intensity $I_{A113}$ assigned to the plane index 113 (2θ=24 to 25°) of $LiTi_2P_3O_{12}$ was $I_{A113}/I_{B111}$=3.5.

The specific gravity of the obtained glass-ceramics was 2.7 as measured by the Archimedes method.

The microstructure of the obtained glass-ceramics was observed using SEMS-3000N manufactured by Hitachi, Ltd.; the glass-ceramics contained many voids having a size of about 2 to 3 μm, indicating that the sintered body was not dense.

The front and back sides of the sintered substrate having the sintered green sheet were milled and polished, and then gold was sputtered on the front and back sides of the glass-ceramics using Quick Coater manufactured by Sanyu Electron Co., Ltd., thus forming gold electrodes. The lithium ion conductivity at 25° C. was determined from complex impedance measurement by an AC two terminal method using an impedance analyzer SI-1260 manufactured by Solartron; the lithium ion conductivity at 25° C. was $2.1 \times 10^{-4}$ S·cm$^{-1}$.

The specific gravity and ion conductivity were lower than those in Example 2, and voids were dispersed in the sintered body, indicating that the sintered body was not dense.

What is claimed is:

1. A glass-ceramics comprising at least crystallines having an LiTi$_2$P$_3$O$_{12}$ structure, the crystallines satisfying $1 < I_{A113}/I_{A104} \leq 1.9$, wherein $I_{A104}$ is the peak intensity assigned to the plane index 104 (2θ=20 to 21°), and $I_{A113}$ is the peak intensity assigned to the plane index 113 (2θ=24 to 25°) as determined by X-ray diffractometry.

2. The glass-ceramics according to claim 1, comprising crystallines having an AlPO$_4$ structure.

3. The glass-ceramics according to claim 2, which satisfies $4 < I_{A113}/I_{B111} \leq 10$, wherein $I_{B111}$ is the peak intensity assigned to the plane index 111 (2θ=21 to 22°) of the crystallines having an AlPO$_4$ structure as determined by X-ray diffractometry.

4. The glass-ceramics according to claim 1, comprising the following components in terms of mol % oxides:

Li$_2$O, 11 to 17%;
Al$_2$O$_3$, 4 to 10%;
SiO$_2$, 1 to 8%;
P$_2$O$_5$, 31 to 39%;
TiO$_2$, 35 to 42%; and
ZrO$_2$, 0 to 5%.

5. The glass-ceramics according to claim 1, having a lithium ion conductivity of $5 \times 10^{-5}$ Scm$^{-1}$ or more at 25° C.

6. The glass-ceramics according to claim 1, having a specific gravity of 2.6 to 3.0.

7. The glass-ceramics according to claim 1, wherein the glass-ceramics does not comprise voids having a size of 1 μm or more.

* * * * *